United States Patent [19]

Hilfman

[11] 4,209,384

[45] Jun. 24, 1980

[54] HYDROCARBON HYDROPROCESSING

[75] Inventor: Lee Hilfman, Mount Prospect, Ill.

[73] Assignee: UOP Inc., Des Plaines, Ill.

[21] Appl. No.: 972,629

[22] Filed: Dec. 22, 1978

[51] Int. Cl.² .................. B01J 29/06; C10G 13/02
[52] U.S. Cl. .................... 208/111; 252/455 Z
[58] Field of Search .............. 252/455 Z; 208/111

[56] References Cited
U.S. PATENT DOCUMENTS

| | | | |
|---|---|---|---|
| 3,523,914 | 8/1970 | Mitsche et al. | 252/455 Z |
| 4,009,096 | 2/1977 | Pollitzer et al. | 252/455 Z |
| 4,121,996 | 10/1978 | Hilfman | 252/455 Z |
| 4,128,591 | 12/1978 | Carr et al. | 252/455 Z |

*Primary Examiner*—Carl F. Dees
*Attorney, Agent, or Firm*—James R. Hoatson, Jr.; John G. Cutts, Jr.; William H. Page, II

[57] ABSTRACT

A hydroprocessing catalyst of an alumina-mordenite carrier material and a platinum component. The catalyst is prepared by incorporating the platinum component with a solution having a pH greater than about 6.

7 Claims, No Drawings

HYDROCARBON HYDROPROCESSING

APPLICABILITY OF THE INVENTION

Hydrocarbon hydroprocessing alludes to the conversion of hydrocarbonaceous material in which a chemical consumption of hydrogen occurs. Principal among hydroprocesses are hydrocracking of heavier hydrocarbons into lower-boiling products and hydrotreating, or hydrorefining, wherein a hydrocarbonaceous feedstock is "cleaned up" in order to prepare a charge stock suitable for utilization in a subsequent hydrocarbon conversion process. Although applicable to other hydrogen-consuming processes, i.e., the hydrogenation of aromatic hydrocarbons, the present invention is particularly directed toward a catalytic composite which exhibits an unusual degree of activity and stability when utilized in a hydrocracking process.

The literature is replete with a multitude of processes and catalysts to be employed in the treatment of heavier charge stocks including kerosenes, light gas oils, full boiling range gas oils, heavy gas oils and even reduced crude black oil.

The present invention is especially advantageous when utilized in a process for hydrocracking hydrocarbonaceous material to produce lower-boiling hydrocarbon products.

The principal advantage stems from increased catalytic stability, or the capability to perform the intended function in an acceptable manner for an extended period of time. Thus, the present invention can be utilized for the maximum production of LPG (liquefied petroleum gas) in the propane/butane range from naphtha, or gasoline boiling range fractions. Heavier charge stocks, including kerosene, light gas oils, heavy gas oils and "black oils" can be converted into lower-boiling products including gasolines, kerosenes, middle distillates, etc.

The catalytic composite which constitutes the present invention is considered a dual-function catalyst. That is, it possesses both hydrogenation activity and cracking activity. It is not only important that the dual-function catalyst exhibit the capability to perform its specified functions initially, but also that it has the propensity to perform such functions satisfactorily for prolonged periods of time. The analytical terms employed in the petroleum refining art, to measure the degree to which a particular catalyst performs, are activity, selectivity and stability. For the purposes of discussion herein, these terms are conveniently defined, for a given charge stock as follows: (1) activity is the measure of the ability of the catalyst to convert the hydrocarbon reactants into products, at a specified severity level, wherein severity level connotes the conditions employed; (2) selectivity refers to the quantity of the reactants that are converted into the desired product and/or products; and (3) stability refers to the rate of change of activity and selectivity parameters—the smaller rate implying the more stable catalyst.

With respect to hydrocracking, for example, activity, stability and selectivity are similarly defined, and, for the most part, allude to the same considerations. Thus, "activity" refers to the quantity of charge stock, boiling above a given temperature which is converted to hydrocarbons boiling below the given temperature. "Selectivity" connotes the quantity of converted charge stock which boils below the desired end point of the product, and above a minimum specified initial boiling point. "Stability" refers to the rate of change of activity and stability. For example, where a gas oil, boiling above about 650° F., is subjected to hydrocracking, "activity" connotes the conversion of 650° F.—plus charge stock into 650° F.—minus product. "Selectivity" might allude to the degree of conversion into gasoline boiling range hydrocarbons, i.e. pentanes and heavier normally liquid hydrocarbons boiling up to about 400° F. "Stability" might be conveniently expressed in terms of temperature increase required during various increments of catalyst life, in order to maintain the desired activity.

OBJECTS AND EMBODIMENTS

The principal object of the present invention is to provide a novel catalytic composite for utilization in the conversion of hydrocarbonaceous material.

Another object is to provide an improved process for hydrocracking a hydrocarbon feedstock, which process is effected through the use of a catalyst composition comprising a platinum component on a support comprising alumina and mordenite.

Therefore, in one embodiment, the present invention provides a catalyst comprising a platinum component on a solid support comprising alumina and mordenite wherein said platinum component is incorporated upon said solid support with a solution having a pH greater than about 6.

In another embodiment, the hydrocracking conditions include a maximum catalyst bed temperature of about 600° F. to about 900° F., a pressure of about 100 to 5000 psig., a liquid hourly space velocity of about 0.1 to 10 and a hydrogen circulation rate of about 500 to about 50,000 SCFB.

Other objects and embodiments of my invention relate to additional details regarding the preferred catalytic ingredients, the concentration of components within the catalytic composite, the method of catalyst preparation, preferred processing techniques and similar particulars which are hereinafter set forth in the following, more detailed summary of my invention.

SUMMARY OF THE INVENTION

Catalytic composites which are tailored for the conversion of hydrocarbonaceous material, and particularly in a hydrocracking or hydrorefining process, have traditionally consisted of metallic elements chosen from Groups VI-B and VIII of the Periodic Table. In general, platinum has been combined with porous carrier materials including inorganic oxides and used as hydrocarbon conversion catalyst. A convenient and long practiced method for incorporating platinum on catalysts has been the contacting of a chloroplatinic acid solution with the desired support material. The pH of a typical chloroplatinic acid solution used in the preparation of a platinum-containing catalyst would be below about 1.

I have found that a very active and stable hydroprocessing catalyst can be prepared when an alumina-mordenite support material is contacted with a platinum-containing solution having essentially a neutral or basic pH. A suitable impregnating solution may be prepared by dissolving water-soluble salts to yield an aqueous platinum solution having a pH greater than about 6. Salts, such as diamino platinum dinitrate and ammonium chloroplatinite, for example, provide excellent impregnating solutions for use in the present invention.

The mordenite-alumina support material may be prepared in any convenient manner and may be in the form of spheres, pellets, extrudates, pills, rods, rings, etc. The mordenite-alumina will generally carry a platinum metal component loading of about 0.01 to 2 weight percent platinum based on the elemental metal.

After the mordenite-alumina support is impregnated with a platinum-containing solution having a pH of greater than about 6, the final composite will generally be dried at temperatures in the range of from about 200° F. to about 600° F., for a period of from about 2 to about 24 hours or more, and finally calcined at a temperature of about 700° F. to about 1100° F. in an atmosphere of air, for a period of about 0.5 to about 10 hours.

Although not essential to successful hydroprocessing, it is often advisable to incorporate a halogen component into the catalytic composite, particularly where the same is to be utilized in a hydrocracking process. Although the precise form of chemistry of association of the halogen component with the carrier material and the platinum component is not accurately known, it is customary in the art to refer to the halogen component as being combined with one of the ingredients in the catalyst. The halogen may be either fluorine, chlorine, iodine, bromine or mixtures thereof, with fluorine and chlorine being particularly preferred. The quantity of halogen is such that the final catalytic composite contains from 0.1 percent to about 3.5 percent by weight, and preferably from about 0.5 percent to about 1.5 percent by weight, calculated on the basis of the elemental halogen.

Prior to its use in conversion of hydrocarbons, the catalytic composite may be subjected to a substantially water-free reduction technique. Substantially pure and dry hydrogen (less than about 30 vol. ppm of water) is employed as the reducing agent. The calcined catalytic composite is contacted at temperature of about 800° F. to about 1200° F., for a period of about 0.5 to about 10 hours, and effective to substantially reduce the platinum.

The catalyst may be used in a sulfided form. Thus after reduction, the catalyst may be subjected to sulfidation by passing hydrogen sulfide or other suitable sulfur containing compound, in contact therewith, preferably at an elevated temperature of from about 500° to about 1100° F. The reduced catalyst is preferably sulfided by contacting the catalyst with a stream of hydrogen containing from about 1 to about 20 percent or more by volume of hydrogen sulfide at elevated temperatures of from about 500° to about 1100° F. When the petroleum hydrocarbon to be hydrocracked contains sulfur compounds, by design or otherwise, sulfidation may be suitably effected in situ in the initial stages of hydrocracking process.

In accordance with my invention, the hydrocarbon charge stock and hydrogen are contacted with a catalyst of the type described above in a hydrocarbon conversion zone. The contacting may be accomplished by using the catalyst in a fixed-bed system, a moving-bed system, a fluidized-bed system, or in a batch-type operation. In view of the risk of attrition loss of the catalyst, and further in view of the technical advantages attendant thereto, it is preferred to use a fixed-bed system. In this type of system, a hydrogen-rich vaporous phase and the charge stock are preheated by any suitable heating means to the desired initial reaction temperature, the mixture being passed into the conversion zone containing the fixed-bed of the catalyst composite. It is understood, of course, that the hydrocarbon conversion zone may consist of one or more separate reactors having suitable means therebetween to insure that the desired conversion temperature is maintained at the inlet to one or more catalyst beds. The reactants may be contacted with the catalyst in either upward, downward or radial flow fashion.

Hydroprocessing reactions are generally exothermic in nature, and an increasing temperature gradient will be experienced as the hydrogen and charge stock traverse the catalyst bed. It is desirable to maintain the maximum catalyst bed temperature below about 900° F., which temperature is virtually identical to that which may be conveniently measured at the outlet of the reaction zone. In order to insure that the catalyst bed temperature does not exceed the maximum allowed, conventional quench streams, either normally liquid or normally gaseous, introduced at one or more intermediate loci of the catalyst beds, may be utilized. When hydrocracking hydrocarbonaceous charge stocks, a portion of the normally liquid product effluent boiling above the end boiling point of the desired product will generally be recycled to combine with the charge stock. In this type of process, the combined liquid feed ratio (defined as volumes of total liquid to the reaction zone) wil be within the range of about 1.1 to about 6.0.

Specific operating conditions, processing techniques, particular catalytic composites and other individual process details will be given in the following description of a hydroconversion process to which the present invention is applicable. These will be presented by way of examples given in conjunction with commercially-scaled operating units. In presenting these examples, it is not intended that the invention be limited to the specific illustrations, nor is it intended that a given process by limited to the particular operating conditions, catalytic composite, processing techniques, charge stock, etc. It is understood, therefore, that the present invention is merely illustrated by the specifics hereinafter set forth and is solely limited by the claims appended hereto.

EXAMPLE I

This example exemplifies a hydrocracking process intended to produce LPG from a hydrotreated naphtha. In general, hydrocracking conditions will include a maximum catalyst bed temperature of about 600° F. to about 900° F., a pressure of about 500 to about 5000 psig., a liquid hourly space velocity of about 0.1 to about 10 and a hydrogen circulation rate in the range of about 1,000 to about 50,000 SCFB. Obviously, the precise operating conditions in a given circumstance will depend primarily on the physical and chemical characteristics of the charge stock as well as the catalyst activity and the desired end result.

A catalyst was prepared by impregnating a batch of alumina-mordenite extrudate containing 25 percent mordenite with an aqueous solution containing chloroplatinic acid and 2 percent HCl with a pH of approximately <1. A sufficient quantity of the impregnating solution was used to achieve a finished catalyst containing 0.5 wt. percent platinum based on the elemental metal. The impregnated alumina-mordenite extrudates were subsequently dried and calcined. A portion of the finished catalyst was utilized in a hydrocracking process to convert a hydrotreated naphtha having the properties shown in Table I to 100 percent LPG at conditions which include a pressure of 1000 psig, 4 liquid hourly space velocity, 1.5 combined feed ratio, and a hydrogen circulation rate and a hydrogen circulation rate of 10,000 SCFB. In order to achieve 100 percent conversion of the naphtha to LPG, a catalyst peak temperature of 420° C. was required.

TABLE I

| PROPERTIES OF NAPHTHA FEEDSTOCK | |
|---|---|
| API° Gravity at 60° F. | 54.3 |
| ASTM Distillation D86 | |
| IBP, °F. | 210 |
| 10%, °F. | 227 |
| 50%, °F. | 265 |
| 90%, °F. | 316 |
| EBP, °F. | 356 |
| Sulfur, ppm | 0.1 |
| Aromatics, volume percent | 13.5 |
| Naphthenes, volume percent | 41.2 |
| Paraffins | 45.3 |

EXAMPLE II

This example demonstrates the ability of a catalyst prepared according to the present invention to hydrocrack a naphtha to LPG. The catalyst of this example was prepared by impregnating a batch of alumina-mordenite extrudate containing 25 percent mordenite with an aqueous solution of diamino platinum dinitrite which solution had a pH of about 7. A sufficient quantity of the impregnating solution was used to achieve a finished catalyst containing 0.5 wt. percent platinum based on the elemental metal. The impregnated alumina-mordenite extrudates were subsequently dried and calcined in exactly the same manner as in Example I. A portion of the finished catalyst was utilized in a hydrocracking process identical with that of Example I.

However, in order to achieve 100 percent conversion of the naphtha utilizing a catalyst of the present invention, a catalyst peak temperature of only 403° C. was required.

From these results, it is evident that the catalyst of the present invention produced LPG from naphtha while displaying a significantly greater catalyst activity compared with the prior art catalyst.

I claim as my invention:

1. A catalyst composition comprising a platinum component on a solid support comprising alumina and mordenite wherein said platinum component is incorporated upon said solid support with a solution having a pH greater than about 6.

2. The catalyst composition of claim 1 wherein the platinum component is present in an amount from about 0.01 to about 2 wt. percent based on the elemental metal.

3. The catalyst compostion of claim 1 wherein the ratio of mordenite to alumina is from about 0.1 to about 1.

4. The catalyst composition of claim 1 wherein the solution contains diamino platinum dinitrite.

5. The catalyst composition of claim 1 wherein the solution contains ammonium chloroplatinite.

6. The catalyst composition of claim 1 wherein said composition contains from about 0.01 to about 3 wt. percent halogen.

7. A hydrocarbon conversion process which comprises reacting a hydrocarbon and hydrogen at hydrocarbon conversion conditions in contact with a catalytic composite comprising a platinum component on a solid support comprising alumina and mordenite wherein said platinum component is incorporated upon said solid support with a solution having a pH greater than about 6.

* * * * *